US012789380B2

(12) United States Patent
Albrecht et al.

(10) Patent No.: US 12,789,380 B2
(45) Date of Patent: Nov. 10, 2026

(54) SYSTEMS AND METHODS TO CONFIGURE A ROBOTIC WELDING SYSTEM

(71) Applicant: Illinois Tool Works Inc., Glenview, IL (US)

(72) Inventors: Bruce Patrick Albrecht, Neenah, WI (US); Joseph C. Schneider, Greenville, WI (US); Kevin Pagano, Algonquin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 189 days.

(21) Appl. No.: 17/828,939

(22) Filed: May 31, 2022

(65) Prior Publication Data

US 2022/0379477 A1 Dec. 1, 2022

Related U.S. Application Data

(60) Provisional application No. 63/194,466, filed on May 28, 2021.

(51) Int. Cl.
*B25J 9/16* (2006.01)
*B23K 37/006* (2025.01)
(Continued)

(52) U.S. Cl.
CPC ........... *B25J 9/1674* (2013.01); *B23K 37/006* (2013.01); *B23K 37/0229* (2013.01);
(Continued)

(58) Field of Classification Search
CPC ...... B25J 13/003; B25J 13/086; B25J 9/1664; B25J 19/061; G05B 2219/45104;
(Continued)

(56) References Cited

U.S. PATENT DOCUMENTS

2008/0131312 A1* 6/2008 Kang ........................ A61L 2/24 422/22
2009/0277893 A1* 11/2009 Speilman ............... B23K 9/095 219/137.71
(Continued)

FOREIGN PATENT DOCUMENTS

JP 2017-226000 A * 6/2016
KR 20160043414 A * 4/2016 ........... B23K 9/0956

OTHER PUBLICATIONS

JP 2017-226000 A translation provided with FOR document (Year: 2016).*
(Continued)

*Primary Examiner* — Jason Holloway
*Assistant Examiner* — Benjamin J Brosh
(74) *Attorney, Agent, or Firm* — McAndrews Held & Malloy, Ltd.

(57) ABSTRACT

An example robotic welding system, includes: a robotic manipulator configured to manipulate a welding torch; and a robotic controller, comprising: a processor; and a machine readable storage medium comprising machine readable instructions which, when executed by the processor, cause the processor to, in response to initiation of a robotic welding procedure involving the robotic manipulator: prior to starting the robotic welding procedure, output at least one of a visual notification or an audible notification proximate to the robotic manipulator; and after satisfying at least one weld-ready condition, control the robotic manipulator to perform the robotic welding procedure using the welding torch.

17 Claims, 6 Drawing Sheets

(51) Int. Cl.

| | |
|---|---|
| ***B23K 37/02*** | (2006.01) |
| ***B25J 11/00*** | (2006.01) |
| ***B25J 13/00*** | (2006.01) |
| ***B25J 13/08*** | (2006.01) |

(52) U.S. Cl.

CPC ........... *B25J 11/005* (2013.01); *B25J 13/003* (2013.01); *B25J 13/08* (2013.01); *G05B 2219/45104* (2013.01); *G05B 2219/45135* (2013.01)

(58) Field of Classification Search

CPC ........... G05B 2219/24094; G05B 2219/34457; G05B 2219/45135; B23K 37/0229; B23K 11/314; B23K 37/006; B21D 55/00

See application file for complete search history.

(56) References Cited

U.S. PATENT DOCUMENTS

| | | | | |
|---|---|---|---|---|
| 2010/0087955 | A1* | 4/2010 | Tsusaka | B25J 9/0003 700/245 |
| 2013/0345868 | A1* | 12/2013 | One | B25J 9/1664 700/252 |
| 2014/0312020 | A1* | 10/2014 | Daniel | B23K 9/0953 219/124.02 |
| 2016/0125594 | A1* | 5/2016 | Becker | B23K 37/00 315/246 |
| 2017/0146413 | A1* | 5/2017 | Ibrocevic | B25J 19/06 |
| 2018/0170250 | A1* | 6/2018 | Hänninen | G08G 1/163 |
| 2019/0314919 | A1* | 10/2019 | Daniel | B23K 9/1062 |
| 2019/0344442 | A1* | 11/2019 | Hammar | B25J 9/0009 |
| 2019/0362646 | A1* | 11/2019 | Hsu | G09B 19/24 |
| 2019/0374417 | A1* | 12/2019 | Hiratsuka | A61G 13/06 |
| 2020/0206930 | A1* | 7/2020 | Lee | B25J 19/06 |
| 2020/0272154 | A1* | 8/2020 | Bearup | A47L 9/2852 |
| 2020/0368904 | A1* | 11/2020 | Aldridge | B25J 9/0081 |
| 2021/0060792 | A1* | 3/2021 | Yoshida | B23K 9/0956 |
| 2022/0035373 | A1* | 2/2022 | Inamoto | G05D 1/0274 |
| 2022/0055138 | A1* | 2/2022 | Asada | B23K 9/0953 |
| 2022/0355408 | A1* | 11/2022 | Barngrover | B23K 9/287 |
| 2023/0040040 | A1* | 2/2023 | Ennsbrunner | B25J 9/1676 |
| 2023/0041258 | A1* | 2/2023 | Okizaki | B25J 11/005 |

OTHER PUBLICATIONS

ANSI—ANSI/RIA R15.06-1999 American National Standards for Industrial Robots and Robot Systems—Safety Requirements, 1999 version, retrieved from internet Apr. 2024, URL: <https://www.paragonproducts-ia.com/documents/RIA%20R15_06-1999/pdf> (Year: 1999).*

KR 20160043414 A, "Apparatus and Method of Welding", Park, Published Apr. 21, 2016, English Translation provided by Espacenet (Year: 2016).*

Austdac, "Pre-Start Alarm and Communications System Type PSACS1 User Manual", Rev 4, Dated Mar. 24, 2017 (see page [2]), retrieved from web Nov. 2025, URL: <https://hubbellcdn.com/installationmanuals/20-079-12-xx27-04_psacs1_users_manual.pdf> (Year: 2017).*

* cited by examiner

SYSTEMS AND METHODS TO CONFIGURE A ROBOTIC WELDING SYSTEM

RELATED APPLICATIONS

The present application claims the benefit of U.S. Provisional Patent Application Ser. No. 63/194,466, filed May 28, 2021, entitled "SYSTEMS AND METHODS TO CONFIGURE A ROBOTIC WELDING SYSTEM." The entirety of U.S. Provisional Patent Application Ser. No. 63/194,466 is expressly incorporated herein by reference.

BACKGROUND

This disclosure relates generally to robotic welding and, more particularly, to systems and methods to configure a robotic welding system.

Robotic welding is often used to perform repetitive welding operations involving workpieces having a consistent configuration and series of welds to be performed. Collaborative robots are a type of robot which include features enabling use within a closer proximity to personnel than conventional robots.

SUMMARY

Systems and methods to configure a robotic welding system are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
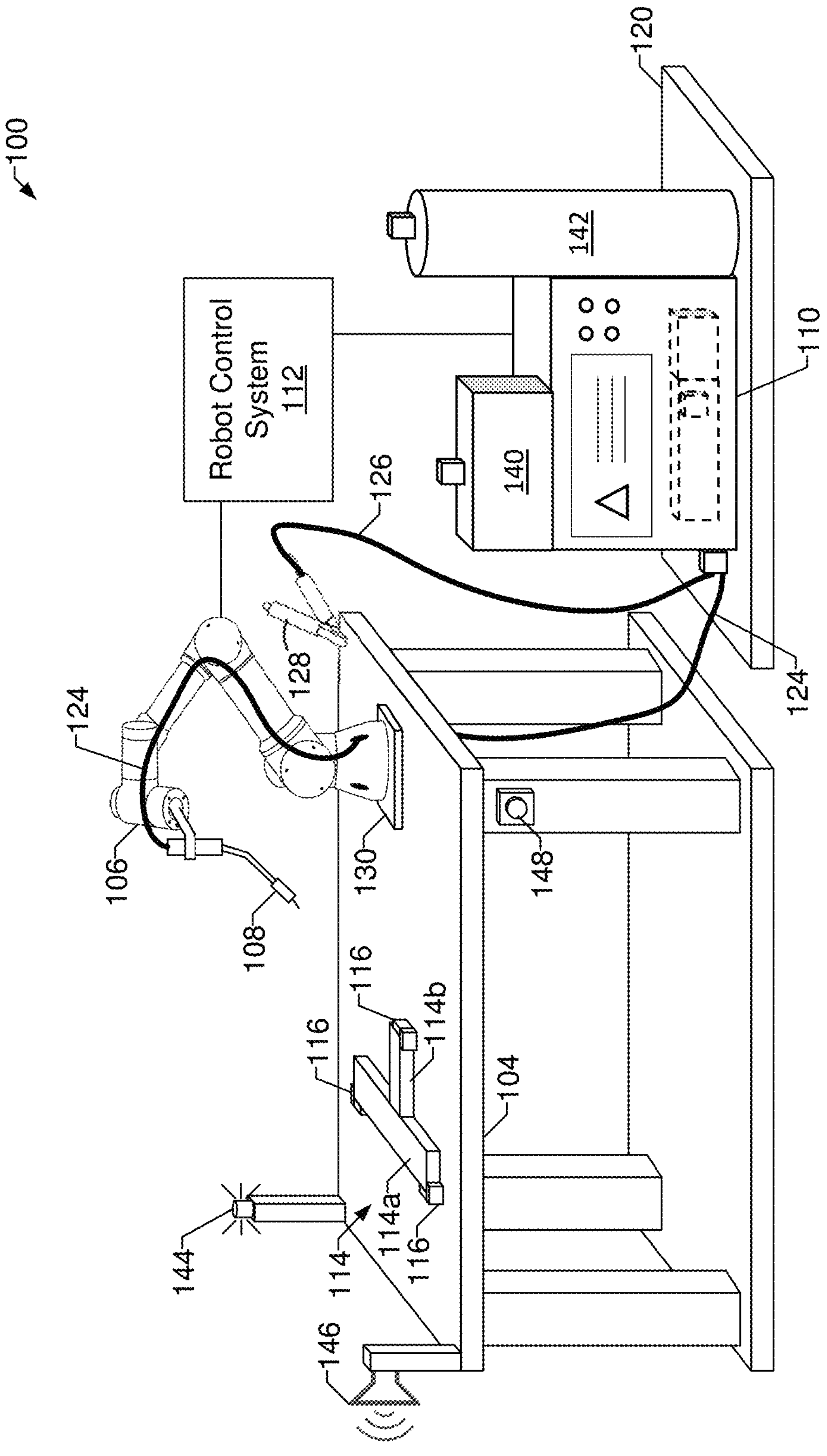
FIG. 1 illustrates an example robotic welding system to perform welding, including a welding-type power supply and a robot control system, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Conventional robotic welding systems rely on physical barriers to exclude the operator from the physical area surrounding the robotic welding operations, which also have the effect of reducing or preventing exposure of robot operators to UV radiation emitted during robotic weld operations. With the advent of collaborative robots and their implementation in welding operations, such physical barriers may be reduced or omitted by fabricators who use such robots for welding.

Disclosed example systems and methods aid robotic weld operators in avoiding arc flash, which can occur when personnel are exposed to UV radiation and/or visible light emitted by welding arcs, by increasing the predictability of impending welding arcs to nearby personnel. In disclosed example systems and methods, the robotic system and/or the welding equipment may enforce a visual and/or audible notification requirement prior to initiation of a first arc in a robotic welding procedure and/or prior to each arc in the robotic welding procedure. The visual and/or audible notifications may be configured proximate to the location of the impending welding arc, such that personnel who observe the notifications are aware of the location of the impending arc. Example visual notifications may include flashing or strobe lights. Example audible notifications may include an audible message, such as "Watch your eyes!", a tone or buzzing sound, a short musical tune, and/or any other audible signal.

In some disclosed example systems and methods, initiation of an arc is further dependent on whether one or more weld-ready conditions are satisfied. Examples of conditions that may be required prior to arc initiation may include: outputting the visual and/or audio notifications for at least a minimum period of time; receiving an operator input, such as a button push, a voice command (e.g., "proceed"), or other operator input; and/or detecting one or more condition(s) of personnel within a physical range of the robotic welding operation using one or more sensors. Example conditions that may be detected using sensors may include determining that personnel are present, or not present, in a particular location via a pressure pad, proximity sensor; face detection or face recognition; and/or detecting markers on an operator's badge, welding helmet, or other operator apparel; detecting a nearby welding helmet via wireless communications, and determining that the welding helmet is both worn and in a down (e.g., protective) position via sensors on the helmet. The presence of operator(s) or other personnel may be detected using pressure sensor(s), laser sensors, light sensors, vibration sensor(s), ultrasonic sensor(s), bar code detection, near field sensor(s), wireless local area network detection, personal area network detection, image recognition, and/or any other type of sensor and/or technique. After initiation of a robotic welding procedure and output of the notification(s) some disclosed example systems and methods automatically start the robotic welding procedure and/or arc(s), without further user input, when the weld-ready condition(s) are determined to be satisfied.

As used herein, a first object being "proximate" to a second object refers to a distance within which the first object (e.g., a device, a visual or audible notification) is associated with the second object to the exclusion of other objects of the same or similar type (e.g., close enough to be associated with one robotic welding system and not others).

A weld-ready condition, as used herein, refers to a condition that must be satisfied for the robot controller to proceed with performing welding via the robotic manipulator. In at least some disclosed examples, weld-ready conditions are limited to personnel-related conditions (e.g., includes notification statuses, personnel location, etc.), exclude equipment errors (e.g., exclude robot collision detection, lack of welding wire supply, welding equipment misconfigurations or errors, etc.) and/or exclude non-welding-related conditions (e.g., exclude robot collision detection, prevention of operation due to equipment interlocks, emergency stop activations, etc.). The weld-ready condition may be different for a first arc in a multi-arc robotic welding procedure than for a subsequent arc in the robotic welding procedure.

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example robotic welding systems include: a robotic manipulator configured to manipulate a welding torch; and a robotic controller, including: a processor; and a machine readable storage medium storing machine readable instructions which, when executed by the processor, cause the processor to, in response to initiation of a robotic welding procedure involving the robotic manipulator: prior to starting the robotic welding procedure, output at least one of a visual notification or an audible notification proximate to the robotic manipulator; and after satisfying at least one weld-ready condition, control the robotic manipulator to perform the robotic welding procedure using the welding torch.

In some example robotic welding systems, the machine readable instructions cause the processor to output a visual notification by illuminating a light proximate to the robotic manipulator or a welding table. In some example robotic welding systems, the machine readable instructions cause the processor to output an audible notification by outputting a sound or audible message proximate to the robotic manipulator or a welding table.

Some example robotic welding systems further include at least one of a discrete input device, a human-machine interface, or a voice recognition system, and the machine readable instructions cause the processor to determine that the at least one weld-ready condition is satisfied in response to identifying an input via the at least one of a discrete input device, a human-machine interface, or a voice recognition system. Some example robotic welding systems further include one or more sensors, and the machine readable instructions cause the processor to determine that the at least one weld-ready condition is satisfied in response to identifying an input via the one or more sensors.

In some example robotic welding systems, the machine readable instructions cause the processor to determine whether the at least one weld-ready condition is satisfied after a start of the at least one of the visual notification or the audible notification. In some example robotic welding systems, the machine readable instructions cause the processor to determine that the at least one weld-ready condition is satisfied in response to the at least one of the visual notification or the audible notification being output for at least a threshold time period.

In some example robotic welding systems, the machine readable instructions cause the processor to identify the initiation of the robotic welding procedure based on at least one of a user input or a part clamp. In some example robotic welding systems, the machine readable instructions cause the processor to output the at least one of the visual notification or the audible notification prior to each arc initiation in a multiple-arc robotic welding procedure. In some example robotic welding systems, the machine readable instructions cause the processor to output the at least one of the visual notification or the audible notification until a conclusion of the robotic welding procedure.

Disclosed example methods to control a robotic welding system involve: identifying, via a robotic controller, an initiation of a robotic welding procedure involving a robotic manipulator; in response to the initiation of the robotic welding procedure, outputting, proximate to the robotic manipulator, at least one of a visual notification via a visual output or an audible notification via an audio output; and in response to identifying that one or more weld-ready conditions are satisfied, controlling the robotic manipulator to perform the robotic welding procedure using the welding torch.

In some example methods, the outputting of the visual notification involves illuminating a light proximate to the robotic manipulator or a welding table. In some example methods, the outputting of the audible notification involves outputting a sound or audible message proximate to the robotic manipulator or a welding table.

In some example methods, determining that the one or more weld-ready conditions are satisfied involves detecting an input via at least one of a discrete input device, a human-machine interface, or a voice recognition system, and determining that the one or more weld-ready conditions are satisfied based on the input from the at least one of the discrete input device, the human-machine interface, or the voice recognition system. In some example methods, determining that the one or more weld-ready conditions are satisfied involves detecting an input via at least one sensor, and determining that the one or more weld-ready conditions are satisfied based on the input from the at least one sensor.

In some example methods, the determining of whether the one or more weld-ready conditions are satisfied occurs after a start of the at least one of the visual notification or the audible notification. In some example methods, the determining of whether the one or more weld-ready conditions are satisfied is in response to the at least one of the visual notification or the audible notification being output for at least a threshold time period.

In some example methods, the identifying of the initiation of the robotic welding procedure is based on at least one of identifying a user input or identifying a status of a part clamp. Some example methods further involve outputting the at least one of the visual notification or the audible notification prior to each arc initiation in a multiple-arc robotic welding procedure. Some example methods further involve outputting the at least one of the visual notification or the audible notification until a conclusion of the robotic welding procedure.

Some other disclosed example welding systems include: power conversion circuitry configured to convert input power to welding-type output power; a robotic manipulator configured to manipulate a welding torch; and a robotic controller, including: a processor; and a machine readable storage medium storing machine readable instructions which, when executed by the processor, cause the processor to, in response to initiation of a robotic welding procedure involving the robotic manipulator: prior to starting the robotic welding procedure, output at least one of a visual notification or an audible notification proximate to the robotic manipulator; and after satisfying at least one weld-ready condition, control the robotic manipulator to perform the robotic welding procedure using the welding torch.

FIG. 1 illustrates an example robotic welding system 100 to perform welding. The example robotic welding system 100 of FIG. 1 includes a welding table 104, a robotic manipulator 106 configured to manipulate a welding torch 108, a welding-type power supply 110, and a robot control system 112.

The welding table 104, robotic manipulator 106, the welding torch 108, the welding-type power supply 110, and/or the robot control system 112, and/or subgroups of these components, may be packaged together (e.g., pre-assembled, pre-calibrated) to provide rapid setup of the robotic welding system 100 for welding at the end-user location. The robotic welding system 100 may be used to make repetitive welds, to leverage the consistency and repeatability advantages of the robotic manipulator 106. In the example of FIG. 1, the robotic manipulator 106 and/or the robot control system 112 are configured as a collaborative robot, which provides features that make the robotic manipulator 106 more conducive to working in areas in which people are proximate the robotic welding system 100.

In the example of FIG. 1, a workpiece 114 is positioned on the welding table 104. The workpiece 114 may include multiple components 114*a*, 114*b* which are to be welded together at one or more joints. To provide consistency in arrangement of the workpiece components 114*a*, 114*b*, the robotic welding system 100 may further include fixtures 116 attached to the welding table 104. The fixtures 116 may guide the placement of the components 114*a*, 114*b*, which can be used to consistently place the multiple components 114*a*, 114*b*.

During a welding operation or welding procedure, the robotic welding system 100 manipulates the welding torch 108, such as the illustrated welding torch, to which power is delivered by the welding-type power supply 110 via a first conductor 124 and returned by way of a work cable 126 and a work clamp 128 coupled to the weld table 104. The welding equipment may further include, for example, a source of shielding gas 142, a wire feeder 140, and other accessories and/or equipment. Other accessories and/or equipment may include, for example, water coolers, fume extraction devices, one or more controllers, sensors, user interfaces, and/or communication devices (wired and/or wireless).

The example robotic welding system 100 is configured to form a weld using any known electric welding techniques. Example electric welding techniques include shielded metal arc welding (SMAW), MIG, flux-cored arc welding (FCAW), TIG, laser welding, sub-arc welding (SAW), stud welding, friction stir welding, and resistance welding. In some examples, the welding-type power supply 110 and/or other welding equipment are configured to support one or more, but fewer than all, types of welding processes. To change welding processes, the welding-type power supply 110, torch 108, and/or other welding equipment may be removed (e.g., disconnected and moved away from the robotic welding system 100) and replaced by a different welding-type power supply, torch, and/or other welding equipment that supports the desired welding process. To facilitate ease of movement, the example welding equipment may be mounted or attached to a cart 120 or other conveyance (e.g., ground conveyance, hanging conveyance, etc.). Additionally or alternatively, multiple different types of welding equipment (e.g., multiple power supplies having different capabilities, multiple torches, etc.) may be co-located (e.g., proximate to a same robotic manipulator 106, on a rack of equipment, etc.) to enable rapid reconfiguration of the robotic welding system 100.

The example robotic manipulator 106 may operate using any number of degrees of freedom to manipulate the welding torch 108. For example, the robotic manipulator 106 may include multiple joints, in which each joint has one or more degrees of freedom, to achieve multiple orientations for accessing one or more weld joints on the workpiece 114. Whereas conventional welding robots are contained within a weld cell that is protected against intrusion by operators during robot operations (e.g., welding operations and/or other movement by the robot), in some examples the robotic welding system 100 is configured as a cobot, has a controller or processor, as well as one or more sensors, that are configured to operate in a manner such that humans do not necessarily need to be excluded from the area in which the robotic manipulator 106 is operating. For example, the robotic manipulator 106 may rapidly detect and respond to collisions, may operate with reduced speed and/or joint torque relative to conventional welding robots, and/or implement other features.

The robotic manipulator 106 is coupled to the table 104 via a base 130. Once secured, the base 130 is fixed with respect to the table 104, and may serve as a reference for position and/or orientation for the robotic manipulator 106.

The example robotic manipulator 106 and/or the example robot control system 112 are configured to transmit commands, requests, data, and/or other messages and/or communications to the power supply 110 via one or more protocols. The robotic manipulator 106 and/or the robot control system 112 are further configured to receive responses, acknowledgments, data, and/or other messages and/or communications from the power supply 110 via the one or more protocols. Based on a robotic welding procedure, the robotic manipulator 106 and/or the robot control system 112 may communicate parameters to the power supply 110 for configuration according to the robotic welding procedure, and/or adjust the welding-type process based on the variables and/or other data obtained from the power supply 110 while performing welding operations. In addition to communication with the power supply 110, the robotic manipulator 106, and/or the robot control system 112, the power supply 110, the robotic manipulator 106, and/or the robot control system 112 may communicate with other welding equipment (e.g., a welding accessory, such as the wire feeder 140) and/or other robotic equipment.

The example robotic welding system 100 of FIG. 1 further includes a visual output device 144, an audio output device 146, and a user input device 148. The visual output device 144 and/or the audio output device 146 are positioned proximate to the robotic manipulator 106 and/or the welding table 104, such that any visual and/or audible notifications are associated with the robotic control system 100 (e.g., to the exclusion of other robotic control systems that may be present in the same facility). While the example system 100 includes audio and/or visual output devices, any other type of notification may be provided. For example, notifications disclosed herein may be performed via any type of audible, visual, haptic, tactile, and/or other perceptible feedback, and may be individually applied or broadly applied.

To notify personnel in the area around the robot control system 112 that an arc is about to be struck, the robot control system 112 outputs at least one of a visual notification (e.g., via the visual output device 144, via a control pendant, via another device in the facility, etc.) and/or an audible notification (e.g., via the audio output device 146, via a facility speaker, etc.) proximate to the robotic manipulator 106 and the welding table 104. In the example of FIG. 1, the robot control system 112 outputs such notifications in response to initiation of a robotic welding procedure involving the robotic manipulator 106, but prior to starting the robotic welding procedure. The notifications may be timed so as to provide nearby personnel sufficient time to cover and/or avert their eyes. The example robot control system 112 determines whether one or more weld-ready conditions are satisfied prior to beginning the robotic welding procedure. When the one or more weld-ready conditions are satisfied, the robot control system 112 then controls the robotic manipulator to perform the configured robotic welding procedure using the welding torch 108.

The weld-ready conditions are enforced by the robot control system 112 to allow welding to proceed. An example weld-ready condition involves outputting the visual and/or audio notifications for at least a threshold time period (e.g., 1-3 seconds) prior to initiation of an arc. Another example weld-ready condition involves receiving an input from the operator (e.g., after the audio and/or visual notifications have begun) to acknowledge or approve the start of the arc or robotic weld procedure. Example inputs from the operator may involve interacting with one or more buttons or other input devices, a voice recognition system that recognizes one or more phrases (e.g., "ok to weld," "go," etc.), a user interface such as a training pendant, and/or any other operator input. Other example weld-ready conditions may involve detecting a location of personnel using one or more sensors, such as: determining that personnel are standing in a particular location via a pressure pad, proximity sensor; face detection or face recognition; and/or detecting markers on an operator's badge, welding helmet, or other operator apparel. The detected location(s) of personnel may be used to enforce that personnel not be in particular location(s) (e.g., not being adjacent the weld table 104, not being present within the expected travel path of the robotic manipulator 106) and/or that personnel be in particular location(s) (e.g., located behind a light-blocking curtain or shield). Another example weld-ready condition may involve detecting a nearby welding helmet via wireless communications, and determining that the welding helmet is both worn and in a down (e.g., protective) position via sensors on the helmet. Any other conditions may be configured for enforcement prior to the start of a robotic welding procedure and/or prior to individual arc strikes.

In some examples, the robot control system 112 may indicate which, if any, weld-ready conditions are not yet satisfied and/or which of multiple modes the robot control system 112 is operating. For example, the robot control system 112 may control the visual output device 144 and/or the audible output device 146 to output an indication of an arc mode and/or an indication that an arc is about to occur. The operator may satisfy a first weld-ready condition by responding via a voice command "go ahead and weld" or "proceed." However, the robot control system 112 determines that the operator is standing within an area defined by a weld-ready condition as requiring exclusion of personnel (e.g., via a pressure mat, optical detection, or any other sensor). In response to the detection, or if the weld-ready condition is not satisfied for at least a threshold time, the robot control system 112 may further indicate (e.g., via a display, via a voice message, etc.) that one or more personnel have been detected as being too close to the robotic manipulator 106 (or other indication of fault or error based on the specific weld-ready condition), which thereby prevents a weld-ready condition from being satisfied, and/or provide instructions regarding how to satisfy the weld-ready condition. An example of such an indication involves outputting an audio message via the audible output device 146, via a personal device (e.g., the detected operator's smartphone or headset), or any other output device, stating "Move away to begin welding." The robot control system 112 may facilitate any number of one-way or two-way interactions with the operator, via any number of input and/or output devices, to achieve satisfaction of all weld-ready conditions.

After outputting of the notification(s), and determining that the one or more conditions for weld-readiness have been satisfied, the robot control system 112 controls the robotic manipulator 106 and the welding power supply 110 to strike the arc(s) and perform the welding. In some examples, the notification(s) and/or the weld-ready conditions may be enforced prior to each arc in a multi-arc procedure. In some examples, the robot control system 112 controls the visual output device 144 and/or the audible output device 146 to continue outputting the notifications until a conclusion of the arc and/or the conclusion of the robotic weld procedure.

While the example above is disclosed with reference to control and enforcement of the notifications and/or conditions by the robot control system 112, in some examples the control and enforcement of the notifications and/or conditions may be implemented using the power supply 110 and/or any other equipment. For example, the power supply 110 may communicate with the robot control system 112 for configuration of welding parameters and control of the welding output.

In some examples, the robot control system 112 analyzes the robotic welding procedure (e.g., a procedure generated by the operator via an interface and/or manual guidance of the robotic manipulator 106) and automatically determines the weld segments. The robot control system 112 may then output visual and/or audio notifications during performance of each of the weld segments.

In some examples, the visual and/or audio notifications (e.g., signals to the visual output device 144 and/or the audible output device 146) are interlocked with a "weld off" input function. For example, while the visual output device 144 and/or the audible output device 146 are outputting notifications, the "weld off" function may be used to prevent starting of an arc. When the notifications are finished (or otherwise satisfied), the "weld off" function may likewise be released or turned off, and an arc permitted to begin.

The example visual output device 144 and/or the audible output device 146, or one or more additional notification device(s), may additionally or alternatively indicate one or more operating modes of the robotic welding system 100. For example, the robotic welding system 100 may operate in a welding mode (e.g., the robot control system 112 and the welding-type power supply 110 perform one or more arc welds), in a dry run mode (e.g., moving the robotic manipulator 106 without an arc to verify a weld path), in a free motion mode (e.g., allowing the operator to freely move the robotic manipulator 106 and/or the torch 108 to perform training or other operation), a disabled mode (e.g., the robotic manipulator 106 is held in a position, such as for maintenance or other activities near the robotic manipulator 106), and/or any other operating modes. The visual output device 144 and/or the audible output device 146 may indicate the mode of operation instead of providing warnings or notifications of impending arcs. The mode indication may be visually or audibly distinguishable from a notification or warning of an impending arc.

In addition, or as an alternative, to outputting notifications of impending arcs, the visual output device 144 and/or the audible output device 146 may be controlled to notify nearby personnel of other actions by the robotic welding system 100. For example, non-welding movements by the robotic manipulator 106 may elicit notifications by the visual output device 144 and/or the audible output device 146. Notifications of non-arc actions may be visually or audibly distinguishable from a notification or warning of an impending arc.

In some examples, the robot control system 112 uses personnel detection information, operating mode information, and/or any other contextual information to determine whether and/or how to perform notifications of an arc or other action by the robotic welding system 100. For example, the robot control system 112 may determine that notifications are not required for non-arc modes of operation when personnel are not detected within a predetermined proximity to the robotic manipulator 106. In other examples, the robot control system 112 may use the same or different audible and/or visual notifications for arc modes of operation (e.g., production modes) and non-arc modes (e.g., teach modes, verification modes) of operation. In another example, the robot control system 112 identifies particular operators who are within a predetermined proximity of the robotic manipulator 106 prior to an arc-on operation, and outputs tactile notifications via personal devices (e.g., helmets, gloves, apparel-worn devices, smartphones, etc.) as well as broadcast notifications (e.g., via the visual output device 144 and/or the audible output device 146) that are perceptible to others in the vicinity of the robotic welding system 100.

Figure 2:
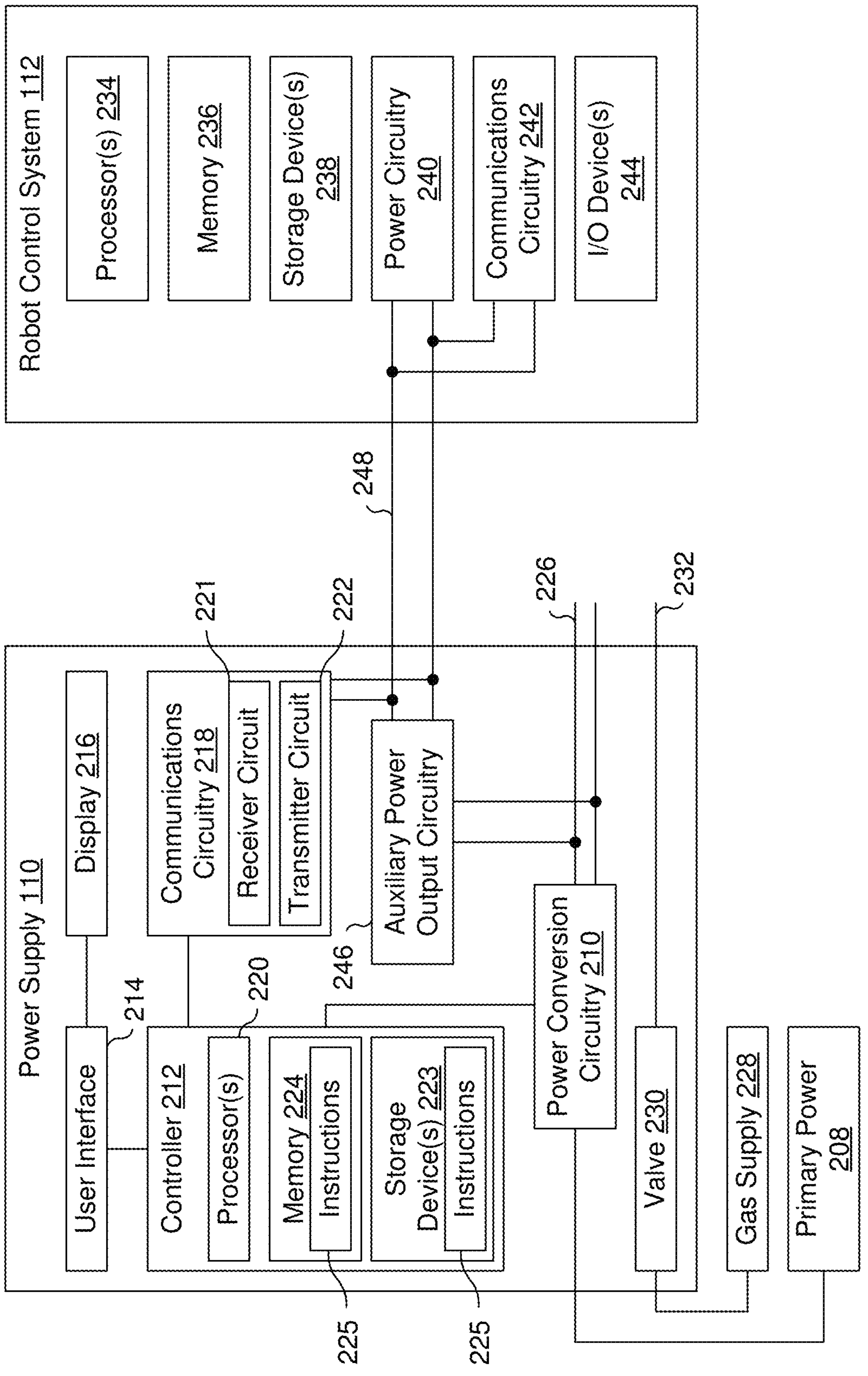
FIG. 2 is a block diagram of an example implementation of the welding-type power supply and the robot control system of FIG. 1.

FIG. 2 is a block diagram of an example implementation of the welding-type power supply 110 and the robot control system 112 of FIG. 1. The example welding-type power supply 110 powers, controls, and supplies consumables to a welding application. In some examples, the welding-type power supply 110 directly supplies input power to the welding torch 108. In the illustrated example, the welding-type power supply 110 is configured to supply power to welding operations and/or preheating operations. The example welding-type power supply 110 may also provide power to a wire feeder to supply electrode wire to the welding torch 108 for various welding applications (e.g., GMAW welding, flux core arc welding (FCAW)).

The welding-type power supply 110 receives primary power 208 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 208 may be supplied from an offsite location (e.g., the primary power may originate from the power grid). The welding-type power supply 110 includes a power conversion circuitry 210, which may include transformers, rectifiers, switches, and so forth, capable of converting the AC input power to AC and/or DC output power as dictated by the demands of the system (e.g., particular welding processes and regimes). The power conversion circuitry 210 converts input power (e.g., the primary power 208) to welding-type power based on a weld voltage setpoint and outputs the welding-type power via a weld circuit.

In some examples, the power conversion circuitry 210 is configured to convert the primary power 208 to both welding-type power and auxiliary power outputs. However, in other examples, the power conversion circuitry 210 is adapted to convert primary power only to a weld power output, and a separate auxiliary converter is provided to convert primary power to auxiliary power. In some other examples, the welding-type power supply 110 receives a converted auxiliary power output directly from a wall outlet. Any suitable power conversion system or mechanism may be employed by the welding-type power supply 110 to generate and supply both weld and auxiliary power.

The welding-type power supply 110 includes a controller 212 to control the operation of the welding-type power supply 110. The welding-type power supply 110 also includes a user interface 214. The controller 212 receives input from the user interface 214, through which a user may choose a process and/or input desired parameters (e.g., voltages, currents, particular pulsed or non-pulsed welding regimes, and so forth). The user interface 214 may receive inputs using any input device, such as via a keypad, keyboard, buttons, touch screen, voice activation system, wireless device, etc. Furthermore, the controller 212 controls operating parameters based on input by the user as well as based on other current operating parameters. Specifically, the user interface 214 may include a display 216 for presenting, showing, or indicating, information to an operator. The controller 212 may also include interface circuitry for communicating data to other devices in the system, such as the wire feeder, the robotic manipulator 106, and/or the robot control system 112. For example, in some situations, welding-type power supply 110 wirelessly communicates with other welding devices within the welding system. Further, in some situations, the welding-type power supply 110 communicates with other welding devices using a wired connection, such as by using a network interface controller (NIC) to communicate data via a network (e.g., ETHERNET, 10 baseT, 10 base100, etc.).

The controller 212 includes at least one controller or processor 220 that controls the operations of the welding-type power supply 110. The controller 212 receives and processes multiple inputs associated with the performance and demands of the system. The processor 220 may include one or more microprocessors, such as one or more "general-purpose" microprocessors, one or more special-purpose microprocessors and/or ASICS, and/or any other type of processing device. For example, the processor 220 may include one or more digital signal processors (DSPs).

The example controller 212 includes one or more storage device(s) 223 and one or more memory device(s) 224. The storage device(s) 223 (e.g., nonvolatile storage) may include ROM, flash memory, a hard drive, and/or any other suitable optical, magnetic, and/or solid-state storage medium, and/or a combination thereof. The storage device 223 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 224 may include a volatile memory, such as random access memory (RAM), and/or a nonvolatile memory, such as read-only memory (ROM). The memory device 224 and/or the storage device(s) 223 may store a variety of information and may be used for various purposes. For example, the memory device 224 and/or the storage device(s) 223 may store processor executable instructions 225 (e.g., firmware or software) for the processor 220 to execute. In addition, one or more control regimes for various welding processes, along with associated settings and parameters, may be stored in the storage device 223 and/or memory device 224, along with code configured to provide a specific output (e.g., initiate wire feed, enable gas flow, capture welding current data, detect short circuit parameters, determine amount of spatter) during operation.

In some examples, the welding power flows from the power conversion circuitry 210 through a weld cable 226. The example weld cable 226 is attachable and detachable from weld studs at each of the welding-type power supply 110 (e.g., to enable ease of replacement of the weld cable 226 in case of wear or damage). Furthermore, in some examples, welding data is provided with the weld cable 226 such that welding power and weld data are provided and transmitted together over the weld cable 226.

In some examples, the welding-type power supply 110 includes or is implemented in a wire feeder.

The example communications circuitry 218 includes a receiver circuit 221 and a transmitter circuit 222. Generally, the receiver circuit 221 receives data transmitted by the robotic manipulator 106 and/or the robot control system 112, and the transmitter circuit 222 transmits data to the robotic manipulator 106 and/or the robot control system 112.

In some examples, a gas supply 228 provides shielding gases, such as argon, helium, carbon dioxide, and so forth, depending upon the welding application. The shielding gas flows to a valve 230, which controls the flow of gas, and if desired, may be selected to allow for modulating or regulating the amount of gas supplied to a welding application. The valve 230 may be opened, closed, or otherwise operated by the controller 212 to enable, inhibit, or control gas flow (e.g., shielding gas) through the valve 230. Shielding gas exits the valve 230 and flows through a gas line 232 (which in some implementations may be packaged with the welding power output) to the wire feeder which provides the shielding gas to the welding application. In some examples, the welding-type power supply 110 does not include the gas supply 228, the valve 230, and/or the gas line 232.

The example robot control system 112 of FIG. 2 includes processor(s) 234, memory 236, one or more storage device(s) 238, power circuitry 240, communications circuitry 242, and one or more I/O device(s) 244.

The example processor(s) 234 execute instructions to configure and/or program a robotic welding procedure, and/or generates commands to execute a robotic welding procedure via the robotic manipulator 106. The processor(s) 234 may include one or more microprocessors, such as one or more "general-purpose" microprocessors, one or more special-purpose microprocessors and/or ASICS, and/or any other type of processing device. For example, the processor(s) 234 may include one or more digital signal processors (DSPs). The memory device 236 may include a volatile memory, such as random access memory (RAM), and/or a nonvolatile memory, such as read-only memory (ROM). The memory device 236 and/or the storage device(s) 238 may store a variety of information and may be used for various purposes. For example, the memory device 236 and/or the storage device(s) 238 may store processor executable instructions (e.g., firmware or software) for the processor(s) 234 to execute. In addition, one or more control regimes for various robotic manipulators and/or robotic welding procedures, along with associated settings and parameters, may be stored in the storage device(s) 238 and/or memory device 236. The storage device(s) 238 (e.g., nonvolatile storage) may include ROM, flash memory, a hard drive, and/or any other suitable optical, magnetic, and/or solid-state storage medium, and/or a combination thereof. The storage device(s) 238 store data (e.g., data corresponding to a welding application), instructions (e.g., software or firmware to perform welding processes), and/or any other appropriate data.

The power circuitry 240 converts input power to power usable by the robot control system 112 (e.g., by the processor(s) 234, the memory 236, the storage device(s) 238, communications circuitry 242, the I/O device(s) 244, and/or the robotic manipulator 106). In the example of FIG. 2, the robot control system 112 is plugged into welding-type power supply 110 to provide operational power to the robot control system 112 and/or the robotic manipulator 106. In the illustrated example, the power supply 110 includes auxiliary power output circuitry 246, which converts input power (e.g., output power from the power conversion circuitry 210, primary power 208) to auxiliary power, such as a standard AC output (e.g., 120 VAC or 240 VAC at 50 Hz or 60 Hz). In such examples, the robot control system 112 can be plugged into the power supply 110 instead of mains power, and receives the auxiliary power via an auxiliary power connection (e.g., auxiliary power conductors 248 such as an AC power cord).

The example communications circuitry 218 and the communications circuitry 242 of FIG. 2 are configured to communicate via the auxiliary power connection. In examples in which the auxiliary power conductors 248 are configured to transmit 120 VAC power (or other high-voltage AC power), the communications circuitry 218 and the communications circuitry 242 may be configured to comply with the IEEE Standard s-2010 and/or any other power line communication standard or technique compatible with high-speed communication over the auxiliary power connection.

The I/O device(s) 244 may include operator or user interfaces and/or other data interfaces. Example I/O device(s) 244 may include a keyboard, a keypad, a mouse, a trackball, a pointing device, a microphone, an audio speaker, a display device, an optical media drive, a multi-touch touch screen, a gesture recognition interface, a magnetic media drive, and/or any other operator interface devices to enable an operator to view information about the robot control system 112, the robotic manipulator 106, a robotic welding procedure, the connected power supply 110 and/or any other connected welding equipment, and/or any other information. For example, the I/O device(s) 244 may include input and/or output device(s) to control movement of the robotic manipulator 106. In other examples, the communications circuitry 242 may also include a communication interface to communicate with and control the robotic manipulator 106.

The power supply 110 may be connected to the example robot control system 112 by plugging the robot control system 112 into the power supply 110 via the auxiliary power connection (e.g., a 120 VAC outlet on the power supply). While the power supply 110 is outputting the auxiliary output power and after the robot control system 112 is powered on and initialized, the power supply 110 and the robot control system 112 may automatically pair by communicating via the auxiliary power connection. To perform the pairing, the power supply 110 detects, via the communications circuitry 218, that the robot control system is coupled to the auxiliary power connection. For example, the communications circuitry 218 (and/or the communications circuitry 242) outputs messages via the auxiliary power connection, which are received and/or acknowledged by the communications circuitry 242 (or the communications circuitry 218).

In response to detecting the robot control system 112 via the auxiliary power connection and receiving communications from the robot control system 112, the controller 212 configures the welding-type power supply 110. For example, upon establishing communication between the robot control system 112 and the power supply 110, the power supply 110 may transmit to the robot control system 112 information that can be used to configure the power supply 110. The robot control system 112 can then provide commands to the power supply 110 to configure the power supply 110 to perform the desired welding processes as part of a robotic welding procedure.

Example information that may be automatically transmitted to the robot control system 112 by the power supply 110 may include an: identifier of a paired welding-type power supply (e.g., a serial number, an assigned name, etc.), an identification of capabilities of a paired welding-type power supply (e.g., a listing of features and/or modifiable parameters, a model number, etc.), software instructions to facilitate control of the welding-type power supply 110 by the robot control system 112 (e.g., a software application or plug-in, software updates, software routines, an API, etc.), identification of a welding capability of the welding-type power supply (e.g., a listing of available welding processes), identification of an adjustable parameter of the welding-type power supply (e.g., parameters that are typically used by an operator, parameters that are modifiable by typically hidden from the operator, robotic welding-specific parameters, etc.) identification of a parameter limitation of the welding-type power supply (e.g., voltage limits, current limits, power limits, wire feed speed limits, frequency limits, etc.), a robotic welding procedure and/or welding-type parameters to perform the robotic welding procedure (e.g., a stored, predefined set of instructions to be implemented by the robot control system 112 to perform a robotic welding procedure), and/or any other information that may be transferred between the power supply 110 and the robot control system 112. Additionally or alternatively, the welding-type power supply 110 may transmit one or more available real-time process data streams, such as welding current measurements, output voltage measurements, wire feed speed measurements. The robot control system 112 may use real-time process data streams for other aspects of the robotic welding procedure, such as process control, seam tracking, and/or any other control.

Additionally or alternatively, the welding-type power supply 110 may transmit information about physical system needs, such as the need for physical isolation or other physical configuration to be performed by the operator, to the robot control system 112. Based on the physical configuration information, the robot control system 112 may display the physical information to an operator via a display or otherwise notify the operator of the physical requirements. Additionally or alternatively, the welding-type power supply 110 may transmit system status information about one or more components of the welding system, for display by the robot control system 112 or other action. Example welding equipment system status information may include internal temperature measurements, airflow measurements, coolant circulation information, error codes and/or other diagnostic information, and/or any other status information.

Figure 3:
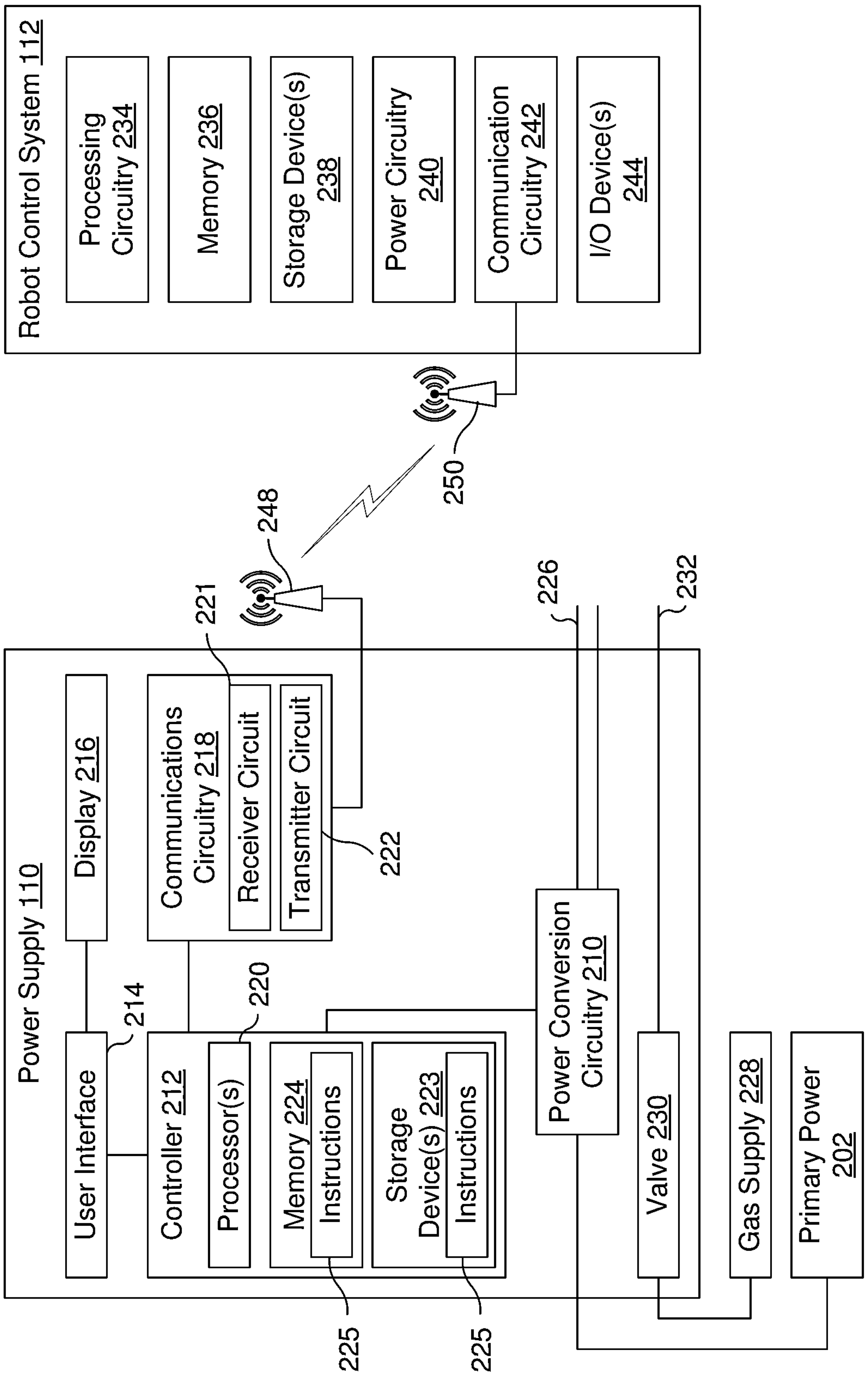
FIG. 3 is a block diagram of another example implementation of the welding-type power supply and the robot control system of FIG. 1.

FIG. 3 is a block diagram of another example implementation of the welding-type power supply 110 and the robot control system 112 of FIG. 1. The example power supply 110 of FIG. 3 includes the components of the example power supply 110 of FIG. 2, but may include or omit the auxiliary power output circuitry 246. The example robot control system 112 of FIG. 3 includes the components of the robot control system 112 of FIG. 2.

In contrast with the power line communication of FIG. 2, the example welding-type power supply 110 and the robot control system 112 of FIG. 3 communicate via wireless communications. To this end, the example communications circuitry 218 and communications circuitry 242 are connected to respective antennas 248, 250.

While establishment of communications may occur automatically using power line communications as in FIG. 2, the example robot control system 112 and/or the power supply 110 may require initiation of pairing by the operator (e.g., via the user interface 214 and the I/O device(s) 244) to establish communication between the robot control system 112 and/or the power supply 110. For example, the operator may select a "Pair" button on each of the user interface 214 of the power supply 110 and a user interface of the robot control system 112, which then causes the communications circuitry 218 and the communications circuitry 242 to perform a pairing procedure. Upon establishing the communications channel via pairing, the power supply 110 and the robot control system 112 automatically exchange information and/or configure the power supply 110 as discussed above. In some examples, the operator may further be prompted to verify the pairing occurred between the desired power supply 110 and robot control system 112 (e.g., neither the power supply 110 nor the robot control system 112 paired with an unintended device nearby).

While example powerline and wireless communications are disclosed above, the example robot control system 112 and the power supply 110 may be coupled using any communications method, including conventional methods such as a control cable.

In the example systems of FIGS. 1, 2, and/or 3, either the robot control system 112 or the power supply 110 may enforce an audible or visual warning prior to striking of an arc as part of a robotic welding procedure. For example, the robot control system 112 may directly control the visual output device 144 and/or the audible output device 146 in response to initiation of a robotic welding procedure and/or prior to each arc of the robotic welding procedure. Additionally or alternatively, the welding power supply 110 may implement a communication protocol that enforces an audible and/or visual notification prior to outputting welding current. For example, the welding power supply 110 may implement a communication protocol that includes a trigger, or arc initiation, input signal from the robot control system 112, and an arc-striking warning output signal to the robot control system 112 (or to another device that controls the visual output device 144 and/or the audible output device 146).

Figure 4:
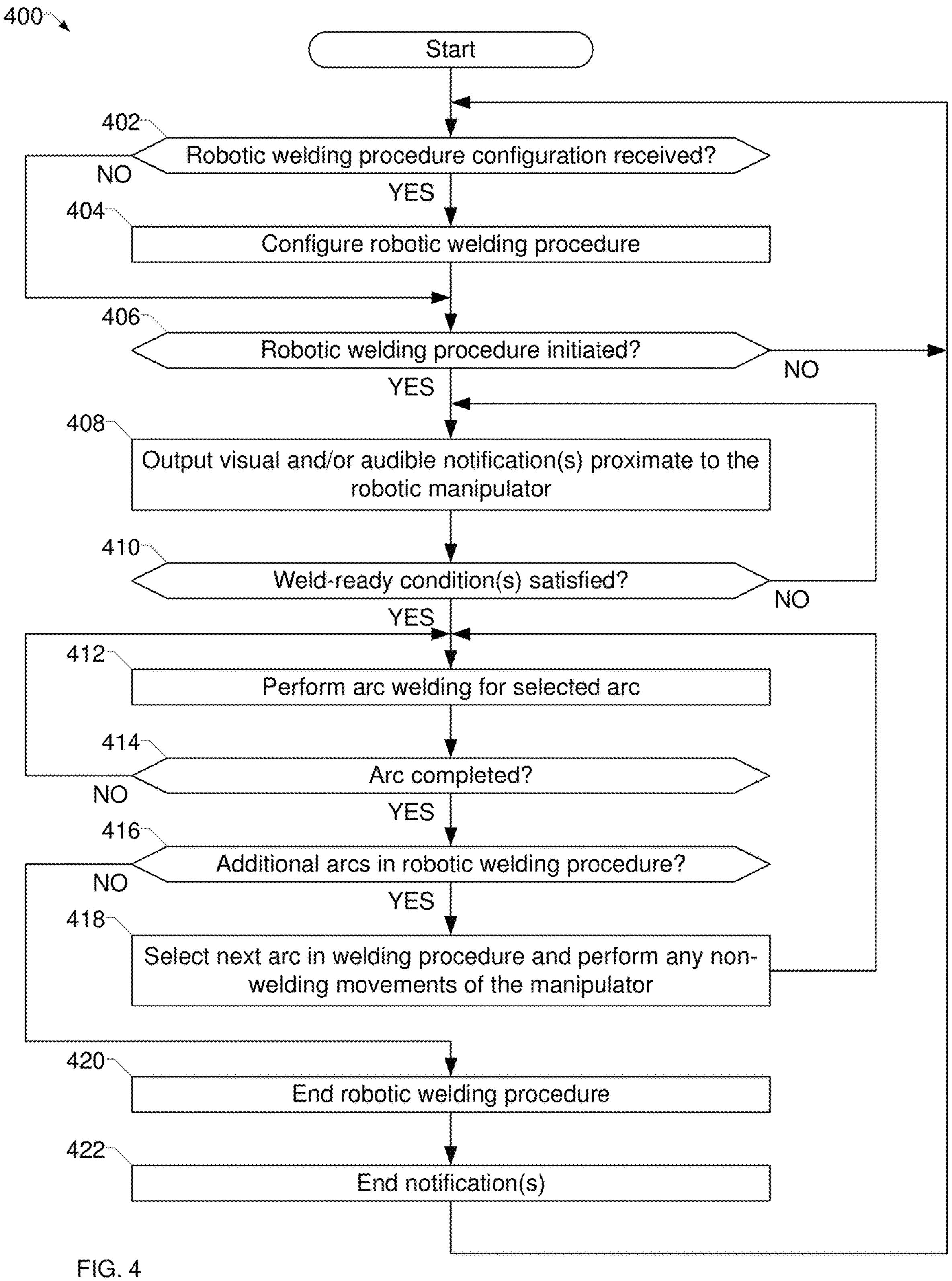
FIG. 4 is a flowchart representative of example machine readable instructions which may be executed by the example robot control system of FIGS. 1, 2, and/or 3 to control an audible and/or visual notification of an impending arc associated with a robotic welding procedure.

FIG. 4 is a flowchart representative of example machine readable instructions 400 which may be executed by the example robot control system 112 of FIGS. 1, 2, and/or 3 to control an audible and/or visual notification of an impending arc associated with a robotic welding procedure. The example instructions 400 are discussed below with reference to the robot control system 112 of FIG. 2.

At block 402, the processor(s) 234 of the robot control system 112 of FIG. 2 determines whether a robotic welding procedure configuration has been received. For example, the robot control system 112 may receive configuration information via the I/O device(s) 244, via the communications circuitry 242, and/or any other input device(s). Example configuration information may include movement instructions for the robotic manipulator 106, welding parameter information, and/or any other configuration information. If a robotic welding procedure configuration has been received (block 402), at block 404 the processor(s) 234 configure the robotic welding procedure based on the received configuration.

After configuring the robotic welding procedure (block 404), or if robotic welding procedure configuration has not been received (block 402), at block 406 the processor(s) 234 determine whether the robotic welding procedure has been initiated. For example, the robotic welding procedure may be initiated based on an operator input (e.g., via the I/O device(s) 244), by securing of a clamp to hold the workpiece 114, and/or any other desired initiation input. If the robotic welding procedure has not been initiated (block 406), control returns to block 402 to await configuration and/or initiation of the robotic welding procedure.

If the robotic welding procedure has been initiated (block 406), at block 408 the processor(s) 234 output visual and/or audible notification(s) proximate to the robotic manipulator 106. For example, the processor(s) 234 may control the visual output device 144 to output a visual notification and/or control the audio output device 146 to output an audio notification.

At block 410, the processor(s) 234 determine whether a set of one or more weld-ready conditions are satisfied. Example weld-ready conditions may include identifying an input via the I/O device(s) 244 (e.g., the operator input device 148 of FIG. 1 or other button, switch, or other physical input device, a touchscreen, a voice recognition system, etc.), the visual notification and/or the audible notification being output for at least a threshold time period, detection of personnel at a particular location and/or outside of a particular location, and/or any other conditions. If the one or more weld-ready conditions are not satisfied (block 410), control returns to block 408 to continue outputting the notification(s).

When the one or more weld-ready conditions are satisfied (block 410), at block 412 the processor(s) 234 control the robotic manipulator 106 and the power supply 110 to perform arc welding for the selected arc. The selected arc may be a first arc or a subsequent arc in a robotic welding procedure. At block 414, the processor(s) 234 determine whether the arc is completed. If the arc is not completed (block 414), control returns to block 412 to continue performing the arc.

When the arc is completed (block 414), at block 416 the processor(s) 234 determine whether there are additional arcs to be performed in the robotic welding procedure. If there are additional arcs to be performed (block 416), at block 418 the processor(s) 234 select the next arc in the robotic welding procedure and control the robotic manipulator 106 to perform any non-welding movements prior to the subsequent arc. Control then returns to block 412 to perform the next arc.

When there are no additional arcs to be performed (block 416), at block 420 the processor(s) 234 end the robotic welding procedure. In the example of FIG. 4, the processor(s) 234 has controlled the visual output device 144 and/or the audio output device 146 to output the notifications during the entirety of the robotic welding procedure. At block 422, the processor(s) 234 control the visual output device 144 and/or the audio output device 146 to end the notification(s). Control then returns to block 402 for configuration and/or execution of a subsequent robotic welding procedure.

Figure 5:
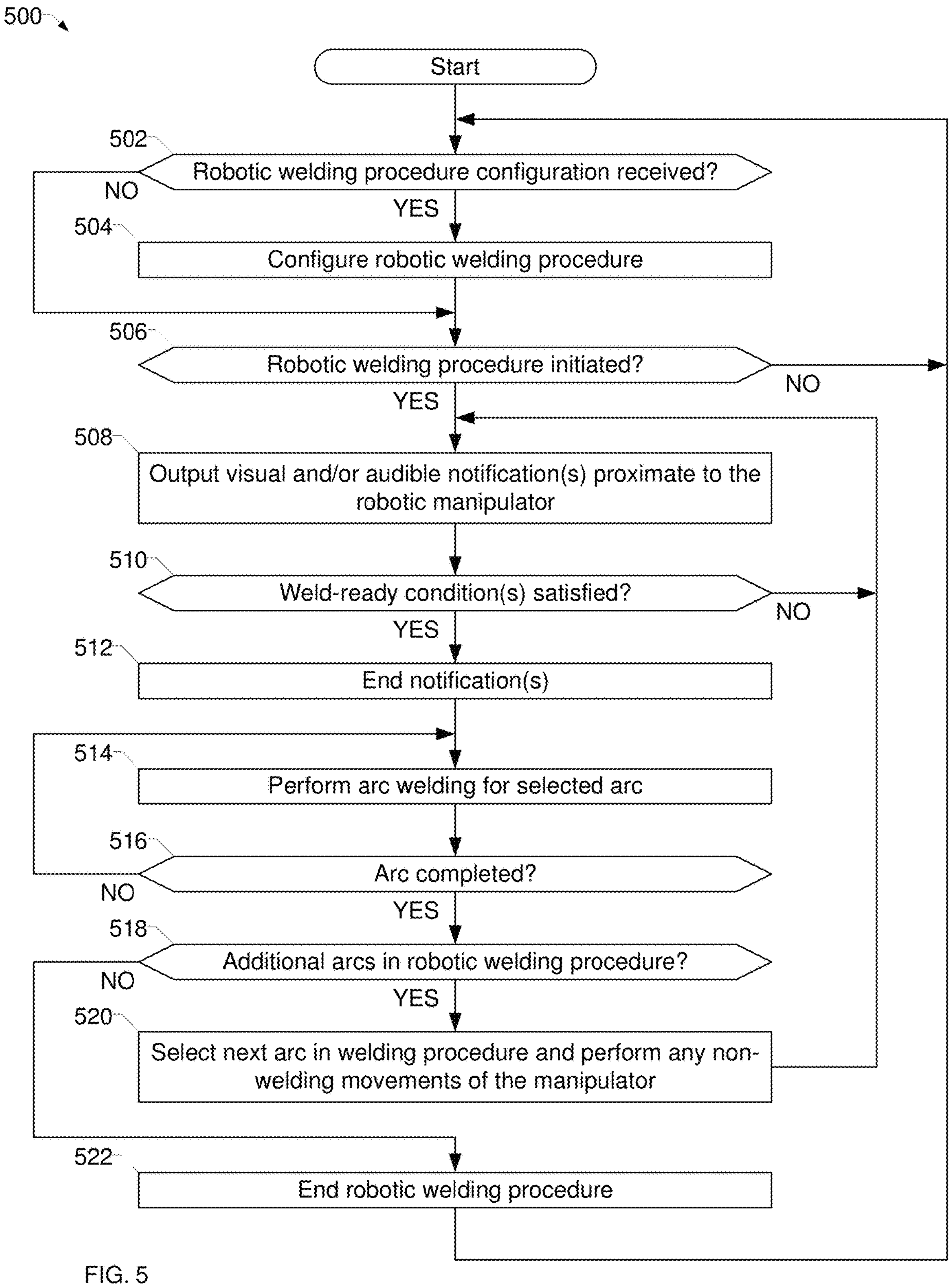
FIG. 5 is a flowchart representative of example machine readable instructions which may be executed by the example robot control system of FIGS. 1, 2, and/or 3 to control an audible and/or visual notification of an impending arc associated with a robotic welding procedure.

FIG. 5 is a flowchart representative of example machine readable instructions 500 which may be executed by the example robot control system 112 of FIGS. 1, 2, and/or 3 to control an audible and/or visual notification of an impending arc associated with a robotic welding procedure. In contrast with the example instructions 400 of FIG. 4 which enforces weld-ready conditions prior to the beginning of the robotic welding procedure, the instructions 500 output and end the notification(s) prior to each arc in the robotic welding procedure. The example instructions 500 are discussed below with reference to the robot control system 112 of FIG. 2.

At block 502, the processor(s) 234 of the robot control system 112 of FIG. 2 determines whether a robotic welding procedure configuration has been received. For example, the robot control system 112 may receive configuration information via the I/O device(s) 244, via the communications circuitry 242, and/or any other input device(s). Example configuration information may include movement instructions for the robotic manipulator 106, welding parameter information, and/or any other configuration information. If a robotic welding procedure configuration has been received (block 502), at block 504 the processor(s) 234 configure the robotic welding procedure based on the received configuration.

After configuring the robotic welding procedure (block 504), or if robotic welding procedure configuration has not been received (block 502), at block 506 the processor(s) 234 determine whether the robotic welding procedure has been initiated. For example, the robotic welding procedure may be initiated based on an operator input (e.g., via the I/O device(s) 244), by securing of a part clamp to hold the workpiece 114, and/or any other desired initiation input. If the robotic welding procedure has not been initiated (block

506), control returns to block 502 to await configuration and/or initiation of the robotic welding procedure.

If the robotic welding procedure has been initiated (block 506), at block 508 the processor(s) 234 output visual and/or audible notification(s) proximate to the robotic manipulator 106. For example, the processor(s) 234 may control the visual output device 144 to output a visual notification and/or control the audio output device 146 to output an audio notification. In other examples, the notification(s) may be performed via any type of audible, visual, haptic, tactile, and/or other perceptible feedback, and may be individually applied (e.g., selectively provided to personnel who may be in proximity or otherwise affected, such as by a personal device) or broadly applied (e.g., output to anyone close enough to perceive the notification).

At block 510, the processor(s) 234 determine whether a set of one or more weld-ready conditions are satisfied. Example weld-ready conditions may include identifying an input via the I/O device(s) 244 (e.g., the operator input device 148 of FIG. 1 or other button, switch, or other physical input device, a touchscreen, a voice recognition system, etc.), the visual notification and/or the audible notification being output for at least a threshold time period, detection of personnel at a particular location and/or outside of a particular location, and/or any other conditions. If the one or more weld-ready conditions are not satisfied (block 510), control returns to block 508 to continue outputting the notification(s).

When the one or more weld-ready conditions are satisfied (block 510), at block 512 the processor(s) 234 control the visual output device 144 and/or the audio output device 146 to end the notification(s). At block 514, the processor(s) 234 control the robotic manipulator 106 and the power supply 110 to perform arc welding for the selected arc. The selected arc may be a first arc or a subsequent arc in a robotic welding procedure. In some examples, if the weld-ready condition(s) are not satisfied the processor(s) 234 automatically start the robotic welding procedure and/or arc without further user input when the weld-ready condition(s) are determined to be satisfied.

At block 516, the processor(s) 234 determine whether the arc is completed. If the arc is not completed (block 516), control returns to block 514 to continue performing the arc.

When the arc is completed (block 516), at block 518 the processor(s) 234 determine whether there are additional arcs to be performed in the robotic welding procedure. If there are additional arcs to be performed (block 518), at block 520 the processor(s) 234 select the next arc in the robotic welding procedure and control the robotic manipulator 106 to perform any non-welding movements prior to the subsequent arc. Control then returns to block 508 to output the notification(s), enforce the weld-ready conditions, and perform the next arc.

When there are no additional arcs to be performed (block 518), at block 522 the processor(s) 234 end the robotic welding procedure. In some examples, the visual output device 144 and/or the audio output device 146 may output an audible and/or visual notification that the robotic procedure is ended. Example procedure ending notifications may include audible messages or tones, and/or visual indications such as a colored light or light pattern. Control then returns to block 502 for configuration and/or execution of a subsequent robotic welding procedure.

Figure 6:
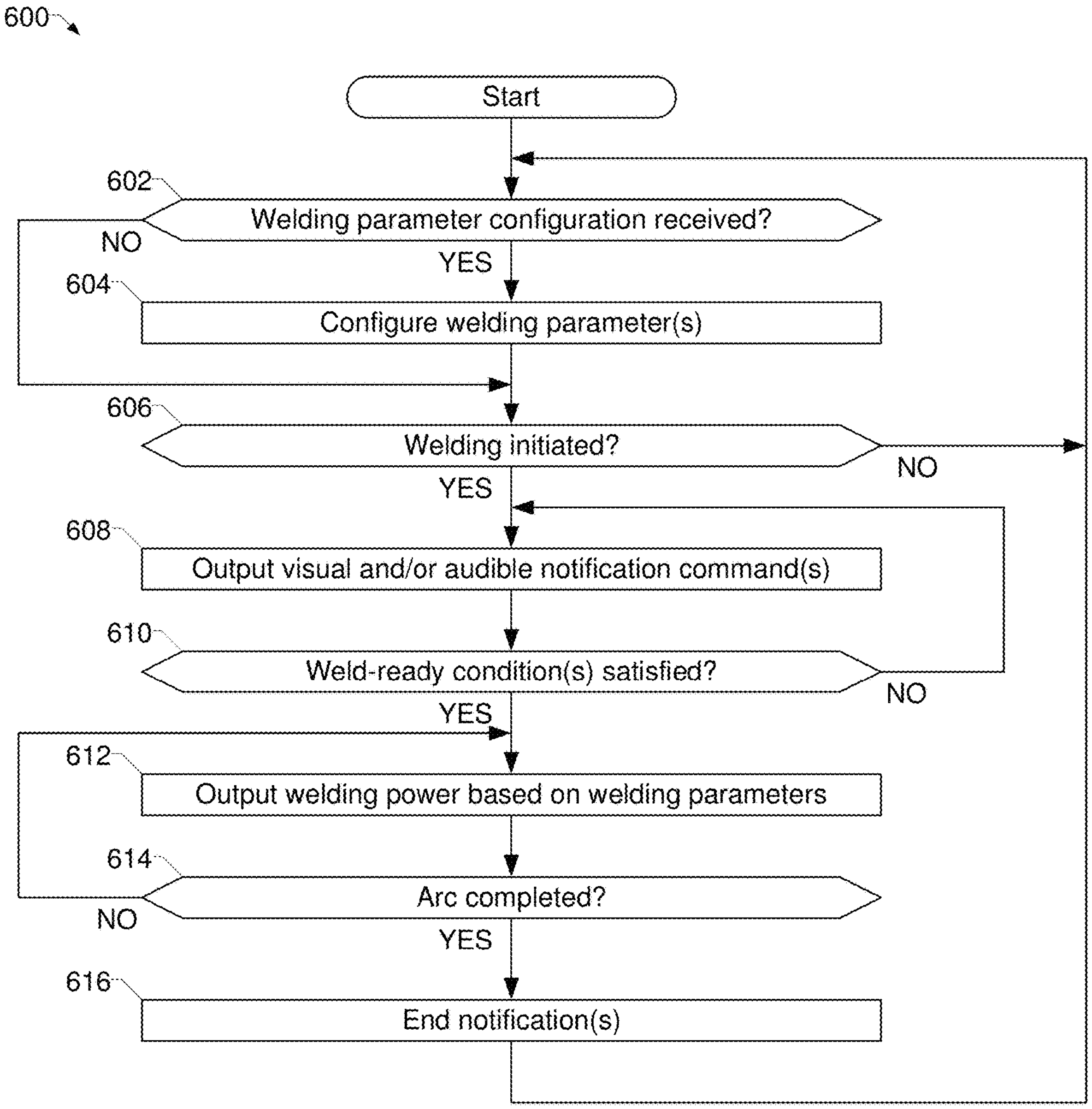
FIG. 6 is a flowchart representative of example machine readable instructions which may be executed by the example welding power supply of FIGS. 1, 2, and/or 3 to control an audible and/or visual notification of an impending arc associated with a robotic welding procedure.

FIG. 6 is a flowchart representative of example machine readable instructions 600 which may be executed by the example welding power supply 110 of FIGS. 1, 2, and/or 3 to control an audible and/or visual notification of an impending arc associated with a robotic welding procedure. In the example of FIG. 6, the welding power supply 110 enforces output of the notification(s) and/or weld-ready condition(s). The example instructions 600 are discussed below with reference to the power supply 110 of FIG. 2.

At block 602, the processor(s) 220 of the power supply 110 of FIG. 2 determines whether a welding parameter configuration has been received. For example, the power supply 110 may receive configuration information via the user interface 214 and/or via the communications circuitry 218 (e.g., from the robot control system 112). If a welding parameter configuration has been received (block 602), at block 604 the processor(s) 220 configure the welding parameters based on the received configuration.

After configuring the welding parameters (block 604), or if welding parameter configuration has not been received (block 602), at block 606 the processor(s) 220 determine whether welding has been initiated. For example, welding may be initiated based on a trigger command received from the robot control system 112. If welding has not been initiated (block 606), control returns to block 602 to await configuration and/or initiation of welding.

If welding has been initiated (block 606), at block 608 the processor(s) 220 output one or more commands to cause visual and/or audible notification(s). For example, the processor(s) 220 may output a command to the robot control system 112, which may directly or indirectly control the output by the visual output device 144 to output a visual notification and/or control the audio output device 146 to output an audio notification. In other examples, the welding power supply 110 may be connected to the visual output device 144 to control output of a visual notification and/or control the audio output device 146 to control output of an audio notification.

At block 610, the processor(s) 234 determine whether a set of one or more weld-ready conditions are satisfied. Example weld-ready conditions may include identifying an input via the communications circuitry 218 and/or the user interface 214 (e.g., the operator input device 148 of FIG. 1 or other button, switch, or other physical input device, a touchscreen, a voice recognition system, etc.), the visual notification and/or the audible notification being output for at least a threshold time period, detection of personnel at a particular location and/or outside of a particular location, and/or any other conditions. If the one or more weld-ready conditions are not satisfied (block 610), control returns to block 610 to continue outputting the notification(s). In some examples, the welding power supply 110 outputs a message to the robot control system 112 to inform the robot control system 112 that the welding output power is not yet ready, so that the robot control system 112 does not prematurely begin movement of the robotic manipulator 106 on the assumption that welding power is being output.

When the one or more weld-ready conditions are satisfied (block 610), at block 612 the processor(s) 220 control the power conversion circuitry 210 to output welding power based on the configured welding parameters. The power supply 110 may also output a message to the robot control system 112 that power is being output, so that the robot control system 112 may timely begin movement of the robotic manipulator 106.

At block 614, the processor(s) 220 determine whether the arc is completed. If the arc is not completed (block 614), control returns to block 612 to continue outputting the weld power. When the arc is completed (block 614), at block 616 the processor(s) 220 end the notification(s) by the visual output device 144 and/or the audio output device 146 (e.g., directly or indirectly, such as via the robot control system 112). Control then returns to block 602.

A multiple-arc robotic welding procedure may also be performed using the instructions 600 of FIG. 6, because the robot control system 112 controls the power supply 110 to output the weld power. In some examples in which the notifications are to be output only prior to the first arc in a robotic welding procedure, the robot control system 112 may be enabled to issue an override command to the power supply 110 or to simulate the weld-ready conditions to satisfy the enforcement by the power supply 110.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power source with a program or other code that, when being loaded and executed, controls the welding power source such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A robotic welding system, comprising:

a robotic manipulator configured to manipulate a welding torch; and a robotic controller, comprising:

a processor; and a machine readable storage medium comprising machine readable instructions which, when executed by the processor, cause the processor to, in response to initiation of a robotic welding procedure, the robotic welding procedure including striking one or more welding arcs using the robotic manipulator:

prior to striking a first arc at a start of the robotic welding procedure, output at least one of a visual notification or an audible notification proximate to the robotic manipulator;

after outputting the at least one of the visual notification or the audible notification, determine whether at least one weld-ready condition is satisfied based on at least one of: identifying an input via the at least one of a discrete input device, a human-machine interface, or a voice recognition system, or identifying an input via one or more sensors; and after determining that the at least one weld-ready condition is satisfied, control the robotic manipulator to strike the first arc and perform the robotic welding procedure using the welding torch.

2. The robotic welding system as defined in claim 1, wherein the machine readable instructions cause the processor to output a visual notification by illuminating a light proximate to the robotic manipulator or a welding table.

3. The robotic welding system as defined in claim 1, wherein the machine readable instructions cause the processor to output an audible notification by outputting a sound or audible message proximate to the robotic manipulator or a welding table.

4. The robotic welding system as defined in claim 1, further comprising the at least one of the discrete input device, the human-machine interface, or the voice recognition system.

5. The robotic welding system as defined in claim 1, further comprising the one or more sensors.

6. The robotic welding system as defined in claim 1, wherein the machine readable instructions cause the processor to determine that the at least one weld-ready condition is satisfied in response to the at least one of the visual notification or the audible notification being output for at least a threshold time period.

7. The robotic welding system as defined in claim 1, wherein the machine readable instructions cause the processor to identify the initiation of the robotic welding procedure based on at least one of a user input or a part clamp.

8. The robotic welding system as defined in claim 1, wherein the machine readable instructions cause the processor to output the at least one of the visual notification or the audible notification prior to each arc initiation in a multiple-arc robotic welding procedure.

9. The robotic welding system as defined in claim 1, wherein the machine readable instructions cause the processor to output the at least one of the visual notification or the audible notification until a conclusion of the robotic welding procedure.

10. A method to control a robotic welding system, the method comprising:

identifying, via a robotic controller, an initiation of a robotic welding procedure, the robotic welding procedure comprising striking one or more welding arcs using a robotic manipulator and involving striking the one or more welding arcs;

in response to the initiation of the robotic welding procedure:

prior to striking a first arc at a start of the robotic welding procedure, outputting, proximate to the robotic manipulator, at least one of a visual notification via a visual output or an audible notification via an audio output;

after outputting the at least one of the visual notification or the audible notification, determining, via the robotic controller, whether one or more weld-ready conditions are satisfied based on at least one of: identifying an input via the at least one of a discrete input device, a human-machine interface, or a voice recognition system, or identifying an input via one or more sensors; and in response to determining that the one or more weld-ready conditions are satisfied, controlling the robotic manipulator to strike the first arc and perform the robotic welding procedure using a welding torch.

11. The method as defined in claim 10, wherein the outputting of the visual notification comprises illuminating a light proximate to the robotic manipulator or a welding table.

12. The method as defined in claim 10, wherein the outputting of the audible notification comprises outputting a sound or audible message proximate to the robotic manipulator or a welding table.

13. The method as defined in claim 10, wherein the determining of whether the one or more weld-ready conditions are satisfied occurs after a start of the at least one of the visual notification or the audible notification.

14. The method as defined in claim 10, wherein the determining of whether the one or more weld-ready conditions are satisfied is in response to the at least one of the visual notification or the audible notification being output for at least a threshold time period.

15. The method as defined in claim 10, further comprising outputting the at least one of the visual notification or the audible notification prior to each arc initiation in a multiple-arc robotic welding procedure.

16. The method as defined in claim 10, further comprising outputting the at least one of the visual notification or the audible notification until a conclusion of the robotic welding procedure.

17. A welding system, comprising:

power conversion circuitry configured to convert input power to welding-type output power;

a robotic manipulator configured to manipulate a welding torch; and a robotic controller, comprising:

a processor; and a machine readable storage medium comprising machine readable instructions which, when executed by the processor, cause the processor to, in response to initiation of a robotic welding procedure, the robotic welding procedure including striking one or more welding arcs using the robotic manipulator:

prior to striking a first arc at a start of the robotic welding procedure, output at least one of a visual notification or an audible notification proximate to the robotic manipulator;

after outputting the at least one of the visual notification or the audible notification, determine whether at least one weld-ready condition is satisfied based on at least one of: identifying an input via the at least one of a discrete input device, a human-machine interface, or a voice recognition system, or identifying an input via one or more sensors; and after determining that the at least one weld-ready condition is satisfied, control the robotic manipulator to strike the first arc and perform the robotic welding procedure using the welding torch.

* * * * *